(12) United States Patent
Finocchio et al.

(10) Patent No.: US 9,304,594 B2
(45) Date of Patent: Apr. 5, 2016

(54) NEAR-PLANE SEGMENTATION USING PULSED LIGHT SOURCE

(71) Applicant: MICROSOFT TECHNOLOGY LICENSING, LLC, Redmond, WA (US)

(72) Inventors: Mark Finocchio, Redmond, WA (US);
Alexandru Balan, Redmond, WA (US);
Nathan Ackerman, Seattle, WA (US);
Jeffrey Margolis, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 91 days.

(21) Appl. No.: 13/862,196

(22) Filed: Apr. 12, 2013

(65) Prior Publication Data

US 2014/0306874 A1    Oct. 16, 2014

(51) Int. Cl.
*G09G 5/00* (2006.01)
*G06F 3/048* (2013.01)
*G06F 3/01* (2006.01)

(52) U.S. Cl.
CPC ............... *G06F 3/017* (2013.01); *G06F 3/011* (2013.01)

(58) Field of Classification Search
USPC ........................................ 345/7–8, 156–173
See application file for complete search history.

(56) References Cited

U.S. PATENT DOCUMENTS

| 7,962,031 | B2 | 6/2011 | Tsai |
| 8,179,604 | B1 | 5/2012 | Prada Gomez et al. |
| 8,350,217 | B2 | 1/2013 | Sa |
| 2007/0263119 | A1* | 11/2007 | Shum et al. ............ 348/371 |

(Continued)

FOREIGN PATENT DOCUMENTS

EP    1465415 A1    10/2004

OTHER PUBLICATIONS

"International Search Report & Written Opinion for PCT Patent Application No. PCT/US2014/033244", Mailed Date: Jul. 29, 2014, Filed Date: Apr. 8, 2014, 12 Pages.

(Continued)

*Primary Examiner* — Grant Sitta
(74) *Attorney, Agent, or Firm* — Dan Choi; Judy Yee; Micky Minhas

(57) ABSTRACT

Methods for recognizing gestures within a near-field environment are described. In some embodiments, a mobile device, such as a head-mounted display device (HMD), may capture a first image of an environment while illuminating the environment using an IR light source with a first range (e.g., due to the exponential decay of light intensity) and capture a second image of the environment without illumination. The mobile device may generate a difference image based on the first image and the second image in order to eliminate background noise due to other sources of IR light within the environment (e.g., due to sunlight or artificial light sources). In some cases, object and gesture recognition techniques may be applied to the difference image in order to detect the performance of hand and/or finger gestures by an end user of the mobile device within a near-field environment of the mobile device.

20 Claims, 11 Drawing Sheets

(56) References Cited

U.S. PATENT DOCUMENTS

| | | | |
|---|---|---|---|
| 2009/0262070 A1* | 10/2009 | Wilson | 345/156 |
| 2010/0199229 A1 | 8/2010 | Kipman | |
| 2010/0281432 A1 | 11/2010 | Geisner | |
| 2011/0080490 A1 | 4/2011 | Clarkson et al. | |
| 2011/0228097 A1 | 9/2011 | Motta | |
| 2011/0293180 A1* | 12/2011 | Criminisi et al. | 382/173 |
| 2012/0195471 A1 | 8/2012 | Newcombe | |
| 2012/0249587 A1* | 10/2012 | Anderson et al. | 345/633 |
| 2012/0319945 A1* | 12/2012 | McCarthy et al. | 345/156 |
| 2014/0118257 A1* | 5/2014 | Baldwin | 345/158 |

OTHER PUBLICATIONS

Mehling, "Implementation of a Low Cost Marker Based Infrared Optical Tracking System," Published Date: Feb. 26, 2006, Proceedings: PhD thesis, Fachhochschule Stuttgart.

Greenspun, "Studio Photography," Published Date: Nov. 28, 2010, Available at http://photo.net/studio/primer.

"Second Written Opinion Issued in PCT Application No. PCT/US2014/033244", Mailed Date: Mar. 3, 2015, 6 Pages.

"International Preliminary Report on Patentability Issued in PCT Application No. PCT/US2014/033244", Mailed Date: Jul. 22, 2015, 7 Pages.

* cited by examiner

US 9,304,594 B2

NEAR-PLANE SEGMENTATION USING PULSED LIGHT SOURCE

BACKGROUND

Home entertainment and gaming systems have begun employing cameras and gesture recognition software to provide a natural user interface. With a natural user interface, a person's body parts and movements may be detected, interpreted, and used to control various aspects of a computing application running on a computing system. The computing system may include a color camera (e.g., an RGB camera) or depth camera for capturing images of a scene. The depth camera may comprise an active illumination depth camera that utilizes time-of-flight (TOF) or structured light techniques for obtaining depth information. The color camera may capture the scene as a color image and the depth camera may capture the scene as a depth map. A depth map may comprise a two-dimensional image of an environment that includes depth information relating to the distances to objects within the environment from a particular reference point, such as a point associated with the depth camera. Each pixel in the two-dimensional image may be associated with a depth value representing a linear distance from the particular reference point.

SUMMARY

Technology is described for recognizing gestures within a near-field environment. In some embodiments, a mobile device, such as a head-mounted display device (HMD), may recognize hand and/or finger gestures performed by an end user of the mobile device. The mobile device may capture a first image of an environment while illuminating the environment using an IR light source. The IR light source may project light into the environment such that a first range is illuminated. Due to the exponential decay of light intensity over distance from a light source the first range may be adequately illuminated for purposes of detecting reflections of the projected IR light. In some cases, the first range may be adjusted by modulating the initial light intensity of the IR light projected from the light source. The light source may include a laser, a laser diode, or an LED. The mobile device may capture a second image of the environment without illumination of the environment. The mobile device may then generate a difference image based on the first image and the second image in order to eliminate background noise due to other sources of IR light within the environment (e.g., from ambient IR light due to sunlight or artificial light sources). In some cases, object and gesture recognition techniques may be applied to the difference image in order to detect the performance of hand and/or finger gestures by an end user of the mobile device within a near-field environment of the mobile device. In some embodiments, an integrated color and IR image sensor may be used to capture the first image and the second image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
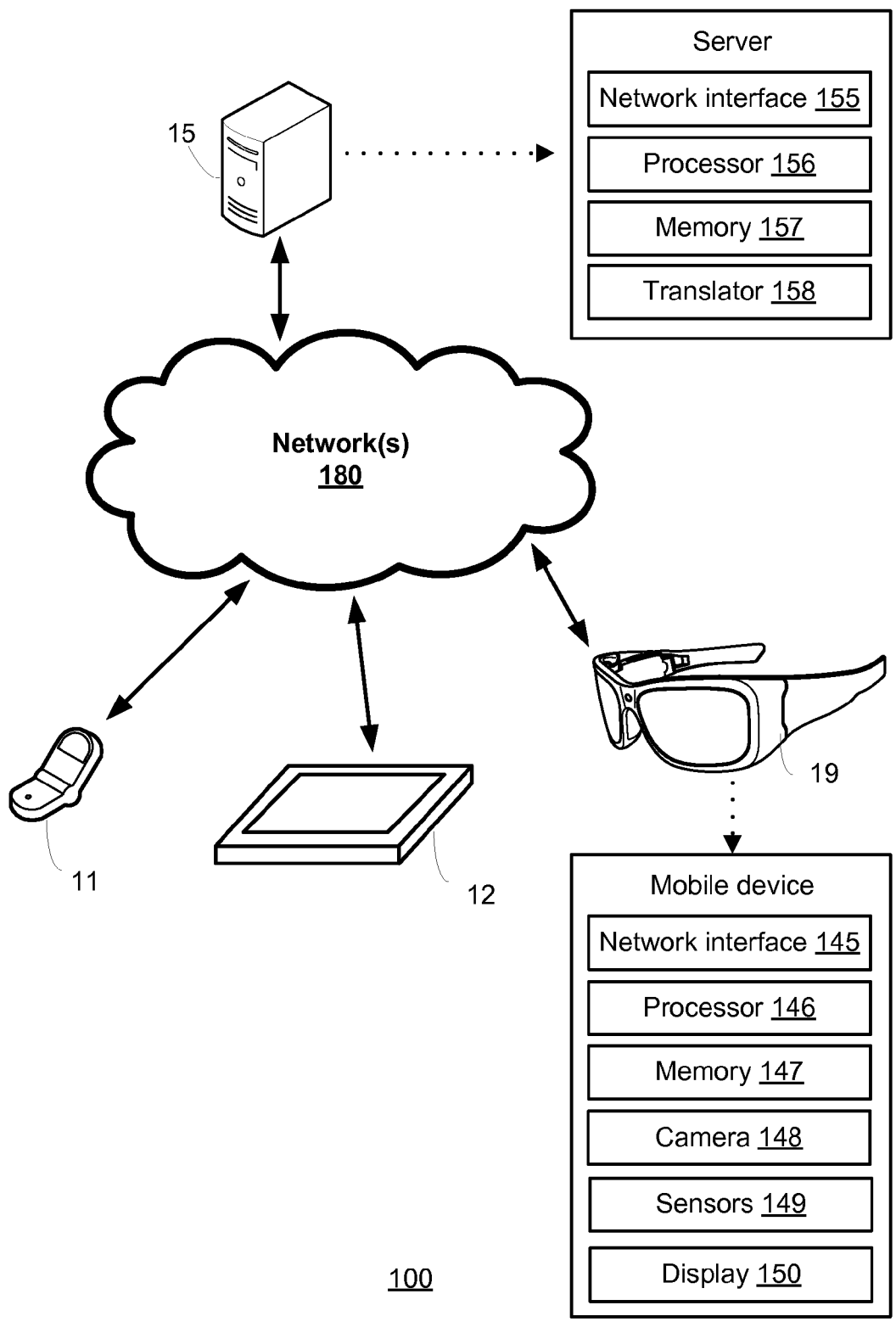
FIG. 1 is a block diagram of one embodiment of a networked computing environment in which the disclosed technology may be practiced.

Technology is described for recognizing gestures within a near-field environment. In some embodiments, a mobile device, such as a head-mounted display device (HMD), may capture a first image of an environment while illuminating the environment using an IR light source with a first range (e.g., due to the exponential decay of light intensity over distance) and capture a second image of the environment without illumination. The mobile device may generate a difference image based on the first image and the second image in order to eliminate background noise due to other sources of IR light within the environment (e.g., from ambient IR light due to sunlight or artificial light sources). In some cases, object and gesture recognition techniques may be applied to the difference image in order to detect the performance of hand and/or finger gestures by an end user of the mobile device within a near-field environment of the mobile device. In some embodiments, an integrated color and IR image sensor may be used to capture the first image and the second image.

In some embodiments, real-time hand and/or finger tracking may be performed based on planar images captured using an HMD. Moreover, parallax calculations based on the location of hand and/or finger boundaries within two or more images may be used to determine three-dimensional positional information or depth information associated with the hand and/or finger boundaries. In one embodiment, depth information may be determined from two or more images captured using two image sensors and one light source associated with the mobile device. In another embodiment, depth information may be determined from two or more images captured using one image sensor and two different light sources. In this case, a first image may be captured using an image sensor while a first light source of two different light sources is used to illuminate an environment during a first point in time and a second image may be captured using the image sensor while a second light source of the two different light sources is used to illuminate the environment at a second point in time subsequent to (or prior to) the first point in time.

In one embodiment, a relative depth value may be generated for each boundary of a near-field object, such as a hand positioned within one meter of the mobile device. For example, it may be determined that a thumb of the hand is closer to the mobile device than a pinky finger or other parts of the hand. In some cases, depth information may be determined for each scan line (or row of pixels) whenever an object boundary is detected (e.g., whenever a boundary between a foreground object and the background is detected). Thus, relative depth information at boundary points of a near-field object (e.g., a hand) may be extracted from two or more images associated with different points of view and used to infer a spatial orientation of the near-field object within a first range of the mobile device.

One issue with controlling an HMD is that, unlike other computing devices, the HMD itself does not inherently provide a physical interface for controlling the HMD (e.g., the HMD may not provide a touchscreen interface as used with tablet computers). Moreover, in some environments (e.g., during a business meeting or while riding a crowded subway), use of voice commands to control the HMD may not be appropriate and therefore gesture recognition may be preferable. However, gesture recognition techniques that rely on depth cameras may be expensive and require relatively higher power and computational complexity as compared with the image segmentation and gesture recognition techniques described herein. Thus, there is a need for a low-cost and energy efficient system that allows an end user of an HMD to control the HMD using hand and/or finger gestures in a wide range of lighting environments (e.g., a dark room or a sunny beach).

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, memory 157, and translator 158, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein. Translator 158 may include mapping logic for translating a first file of a first file format into a corresponding second file of a second file format (i.e., the second file may be a translated version of the first file). Translator 158 may be configured using file mapping instructions that provide instructions for mapping files of a first file format (or portions thereof) into corresponding files of a second file format.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images. Sensors 149 may generate motion and/or orientation information associated with mobile device 19. In some cases, sensors 149 may comprise an inertial measurement unit (IMU). Display 150 may display digital images and/or videos. Display 150 may comprise a see-through display.

In some embodiments, various components of mobile device 19 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 19 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, mobile device 19 comprises a head-mounted display device (HMD) that provides an augmented reality environment or a mixed reality environment to an end user of the HMD (e.g., for controlling applications running on the HMD). The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing an HMD, an end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment may be performed by server 15 (i.e., on the server side) while camera localization may be performed on mobile device 19 (i.e., on the client side). The virtual objects may include a text description associated with a real-world object.

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the one or more virtual objects may be manipulated or controlled by an end user of the mobile device using hand and/or finger gestures.

In some embodiments, an end user of a mobile device may control various aspects of the mobile device (e.g., file transfers, selection of real and/or virtual objects within an environment, or initiation of electronic communications with another) using hand and/or finger gestures. The hand and/or finger gestures may be recognized by the mobile device. The mobile device (e.g., an HMD) may capture a first image of an environment while illuminating the environment using an IR light source attached to or part of the HMD. The IR light source may project (or emit) light into the environment such that a first range is illuminated. Due to the exponential decay of light intensity over distance from a light source only the first range may be adequately illuminated for purposes of detecting reflections of the projected IR light due to objects within the environment. In some cases, the first range may be adjusted by modulating the initial light intensity of the IR light projected from the light source. For example, the first range may be reduced if an energy level for a battery used to power a mobile device is below a particular threshold, if the mobile device is in a low power state, or if ambient IR light within the environment is above a particular threshold. The light source may include an IR laser, a laser diode, and/or an IR LED. The mobile device may capture a second image of the environment without illumination of the environment. The mobile device may generate a difference image based on the first image and the second image in order to eliminate background noise due to other sources of IR light within the environment (e.g., due to sunlight or artificial light sources). In some cases, object and gesture recognition techniques may be applied to the difference image in order to detect the performance of hand and/or finger gestures by an end user of the mobile device within a near-field environment of the mobile device.

Figure 2A:
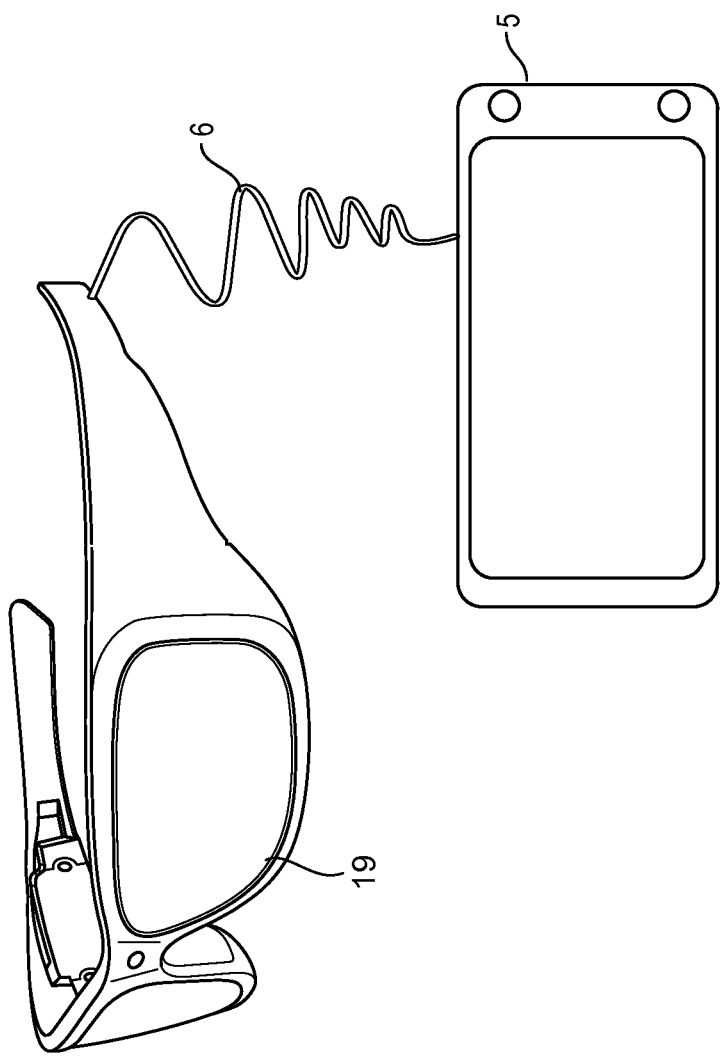
FIG. 2A depicts one embodiment of a mobile device in communication with a second mobile device.

FIG. 2A depicts one embodiment of a mobile device 19 in communication with a second mobile device 5. Mobile device 19 may comprise a see-through HMD. As depicted, mobile device 19 communicates with mobile device 5 via a wired connection 6. However, the mobile device 19 may also communicate with mobile device 5 via a wireless connection. In one example, an HMD worn by an end user of the HMD may wirelessly communicate with a second mobile device (e.g., a mobile phone used by the end user) within a proximity of the end user (e.g., the second mobile device may be in a coat pocket). Mobile device 5 may be used by mobile device 19 in order to offload compute intensive processing tasks (e.g., the rendering of virtual objects and/or the recognition of gestures) and to store information (e.g., models of virtual objects) that may be used to provide an augmented reality environment on mobile device 19 (e.g., used by the end user for controlling applications running on the mobile device). Mobile device 19 may provide motion and/or orientation information associated with mobile device 19 to mobile device 5. In one example, the motion information may include a velocity or acceleration associated with the mobile device 19 and the orientation information may include Euler angles, which provide rotational information around a particular coordinate system or frame of reference. In some cases, mobile device 19 may include a motion and orientation sensor, such as an inertial measurement unit (IMU), in order to acquire motion and/or orientation information associated with mobile device 19.

Figure 2B:
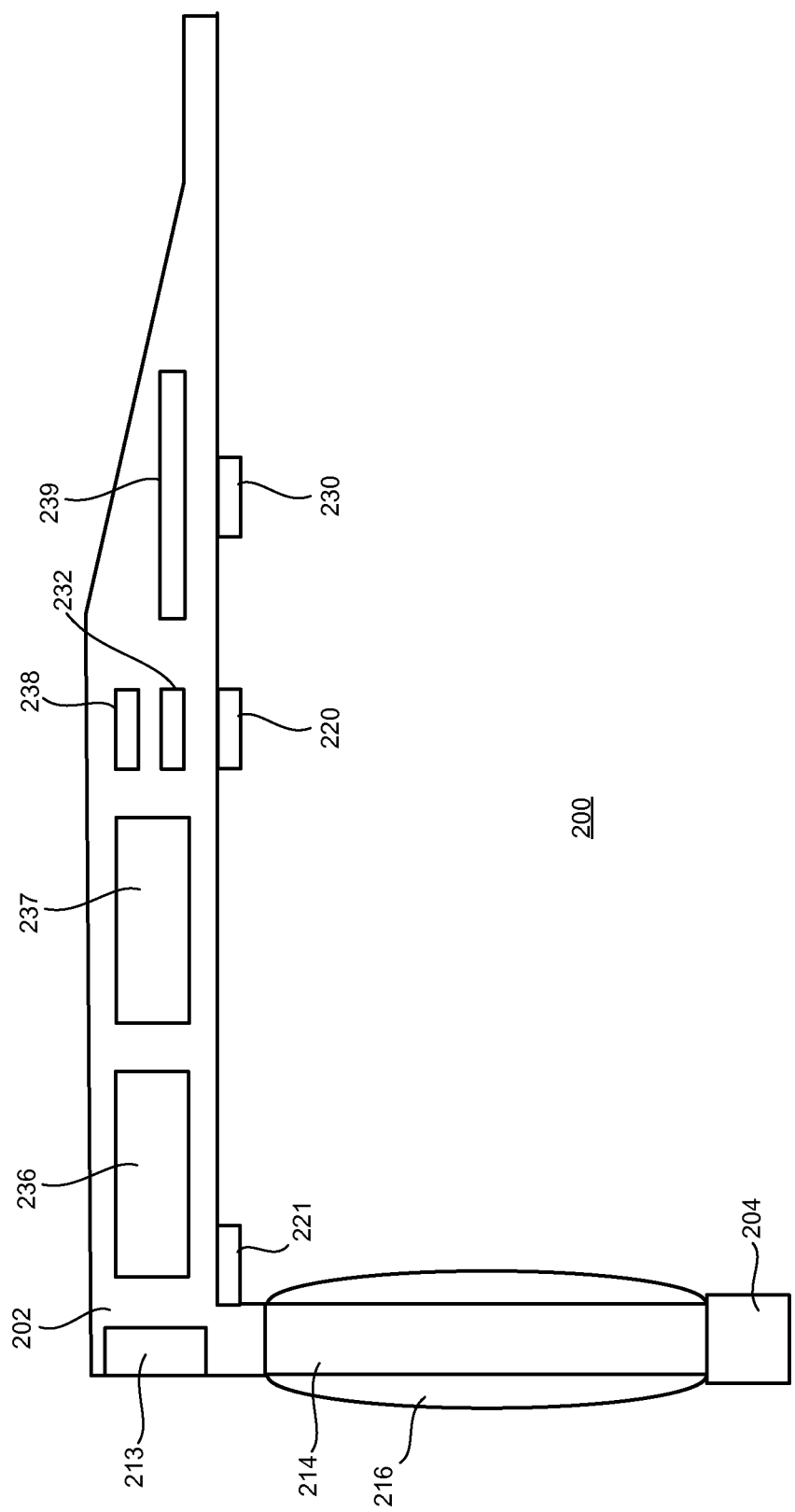
FIG. 2B depicts one embodiment of a portion of an HMD.

FIG. 2B depicts one embodiment of a portion of an HMD, such as mobile device 19 in FIG. 1. Only the right side of an HMD 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The one or more cameras may include one or more image sensors (e.g., a CCD image sensor or a CMOS image sensor). The capture device 213 may also include one or more microphones for recording sounds and may transmit the audio recordings to processing unit 236.

Right temple 202 also includes biometric sensor 220, eye tracking system 221, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include an inward facing camera. In another embodiment, the eye tracking system 221 may comprise an eye tracking illumination source and an associated eye tracking IR sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011, both of which are herein incorporated by reference.

In one embodiment, eye glass 216 may comprise a see-through display, whereby images generated by processing unit 236 may be projected and/or displayed on the see-through display. The capture device 213 may be calibrated such that a field of view captured by the capture device 213 corresponds with the field of view as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Gaze detection may be used to identify where the end user is focusing within a field of view. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

Figure 2C:
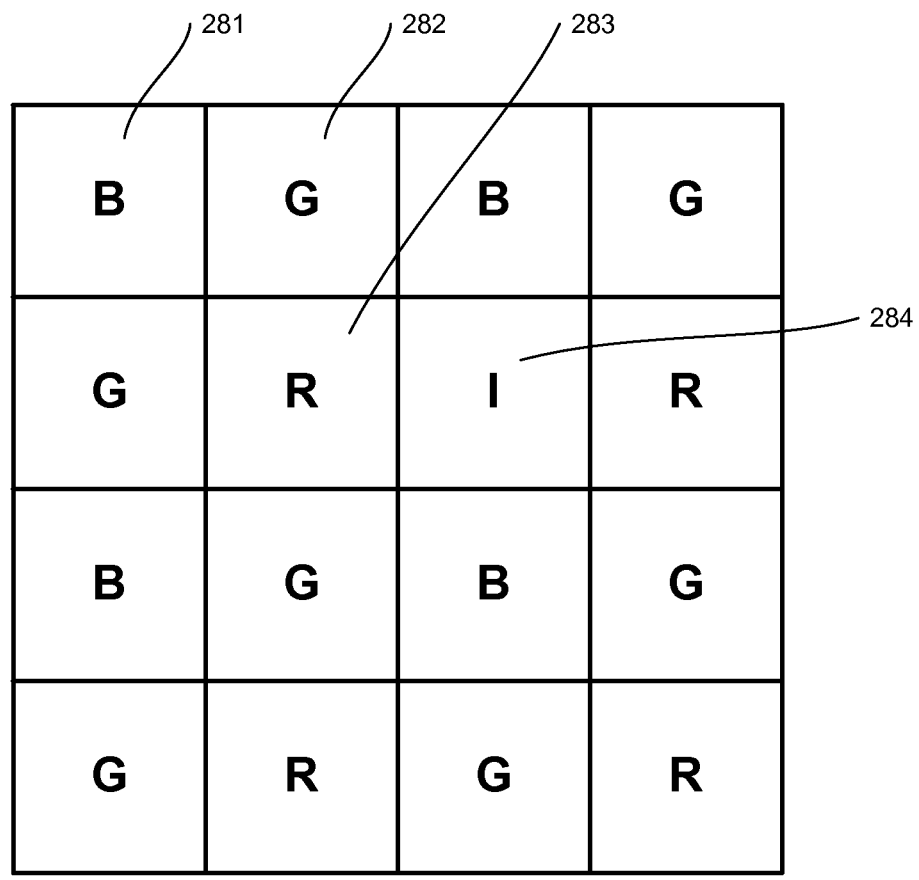
FIG. 2C depicts one embodiment of a portion of an image sensor.

FIG. 2C depicts one embodiment of a portion of an image sensor, which may comprise part of capture device 213 in FIG. 2B. As depicted, the portion of the image sensor comprises color filters arranged over an array of photosensors (e.g., photodiodes). The color filters include a blue light filter 281, a green light filter 282, and a red light filter 283. The arrangement of color filters may be similar to that used with a Bayer filter. The portion of the image sensor depicted also includes an IR light filter 284. Although a color pixel to IR pixel ratio of 1:16 is depicted, other color pixel to IR pixel ratios may also be used (e.g., 1:8 or 1:32). The IR light filter 284 may comprise an IR bandpass filter. The IR light filter 284 may only allow IR light to pass through to photosensors arranged below the IR light filter 284. Thus, the portion of the image sensor integrates both color filters and an IR light filter such that photosensors associated with the portion of the image sensor may obtain both RGB color information and IR light information at the same time. In some cases, the portion of the image sensor depicted may be replicated or stepped in the x and y directions in order to form a larger integrated color and IR light filter that may be placed over a larger array of photosensors.

In one embodiment, an image sensor may include a monochrome filter (visible grayscale) and an IR filter. The monochrome filter may be fabricated using the same materials as a color filter (e.g., red, blue, and green color filters). In one example, different monochrome pixel to IR pixel ratios may be used such as 1:2, 1:4, or 1:16.

Figure 3:
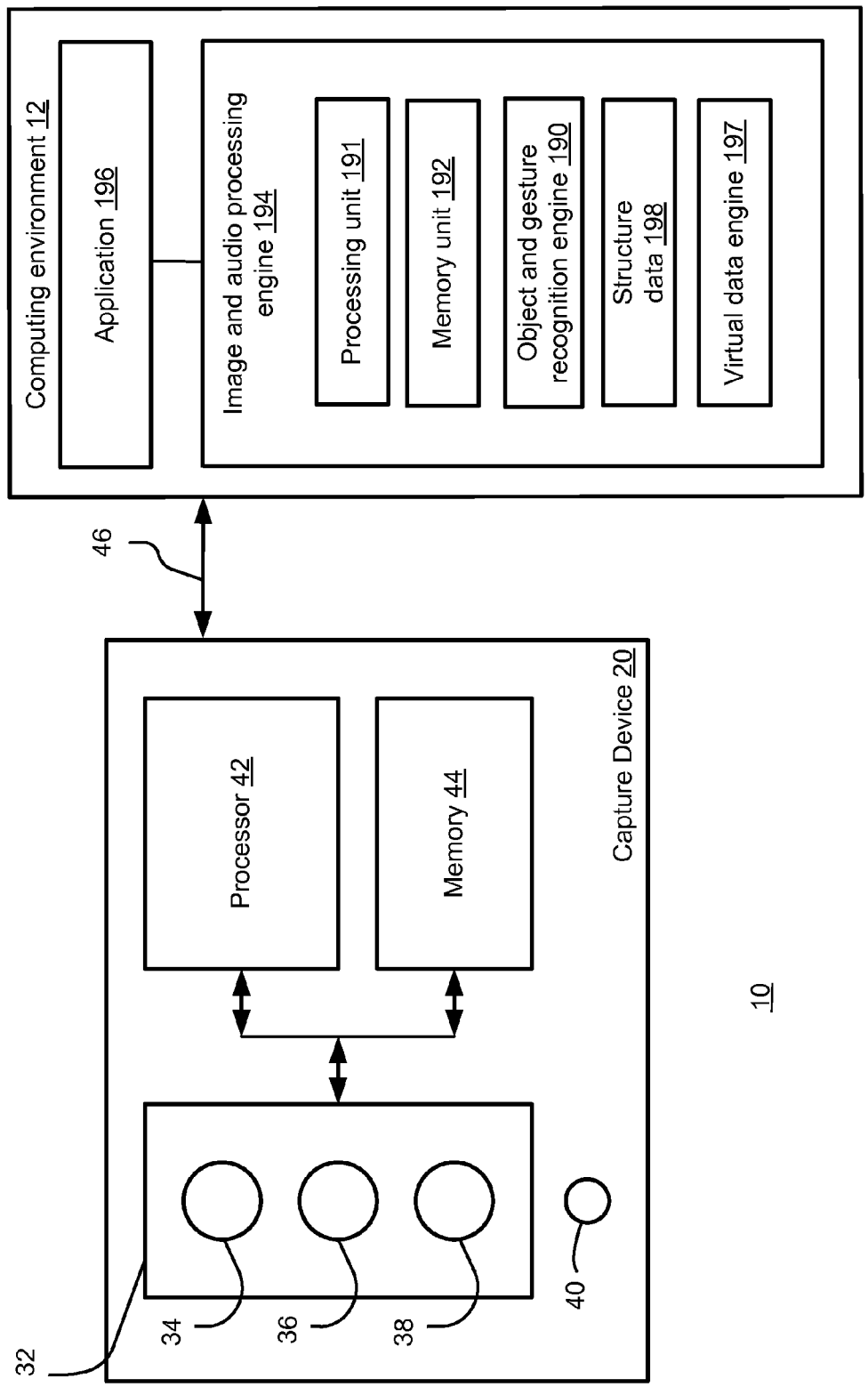
FIG. 3 depicts one embodiment of a computing system including a capture device and computing environment.

FIG. 3 depicts one embodiment of a computing system 10 including a capture device 20 and computing environment 12. In some embodiments, capture device 20 and computing environment 12 may be integrated within a single mobile computing device. The single integrated mobile computing device may comprise a mobile device, such as mobile device 19 in FIG. 1. In one example, the capture device 20 and computing environment 12 may be integrated within an HMD. In other embodiments, capture device 20 may be integrated with a first mobile device, such as mobile device 19 in FIG. 2A, and computing environment 12 may be integrated with a second mobile device in communication with the first mobile device, such as mobile device 5 in FIG. 2A.

In one embodiment, the capture device 20 may include one or more image sensors for capturing images and videos. An image sensor may comprise a CCD image sensor or a CMOS image sensor. In some embodiments, capture device 20 may include an IR CMOS image sensor. The capture device 20 may include an image camera component 32. The image camera component 32 may include an IR light component 34, a depth camera 36, and an RGB camera 38 that may be used to capture the depth image of a capture area. In some cases, the image camera component 32 may include an integrated color and IR image sensor. In one example, the IR light component 34 of the capture device 20 may emit an infrared light into the capture area and may then use sensors to detect the backscattered light from the surface of one or more objects in the capture area using the color and/or IR light sensing components within the image camera component 32. In some embodiments, pulsed infrared light may be used such that the time between an outgoing light pulse and a corresponding incoming light pulse may be measured and used to determine a physical distance from the capture device 20 to a particular location on the one or more objects in the capture area. Capture device 20 may also include optics for producing collimated light and/or for diffusing light (e.g., an optical diffuser for spreading light from an IR light source that generates a narrow beam of light) for illuminating an environment.

As depicted in FIG. 3, capture device 20 may include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in operative communication with the image camera component 32. The processor 42 may include a standardized processor, a specialized processor, a microprocessor, or the like. The processor 42 may execute instructions that may include instructions for receiving and analyzing images and/or determining whether a particular gesture has occurred, or any other suitable instructions. It is to be understood that at least some image analysis and/or gesture recognition operations may be executed by processors contained within one or more capture devices such as capture device 20.

The capture device 20 may include a memory 44 that may store the instructions that may be executed by the processor 42 and images (or frames of images) captured by the light sensing components of the image camera component 32. In one example, the memory 44 may include random access memory (RAM), read only memory (ROM), cache, Flash memory, a non-volatile memory, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 20 may be housed in a single housing.

The capture device 20 may be in communication with the computing environment 12 via a communication link 46. The communication link 46 may be a wired connection or a wireless connection such as a wireless 802.11b, g, a, or n connection. In one embodiment, the capture device 20 may provide the images captured by, for example, the depth camera 36 and/or the RGB camera (or integrated RGB and IR camera) 38 to the computing environment 12 via the communication link 46.

As depicted in FIG. 3, computing environment 12 includes image and audio processing engine 194 in communication with application 196. Application 196 may comprise an operating system application or other computing application such as a gaming application or messaging application. Image and audio processing engine 194 includes virtual data engine 197, object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190. Virtual data engine 197 processes virtual objects and registers the position and orientation of virtual objects in relation to various maps of a real-world environment stored in memory unit 192.

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., a pencil held by an end user of an HMD) and facial recognition may be used to detect the face of a particular person within an environment. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

The image and audio processing engine 194 may utilize structure data 198 while performing object recognition. Structure data 198 may include structural information about targets and/or objects to be tracked. For example, a skeletal model of a human may be stored to help recognize body parts (e.g., arms, hands, and/or fingers). In another example, structure data 198 may include structural information regarding one or more inanimate objects in order to help recognize the one or more inanimate objects (e.g., a pencil).

The image and audio processing engine 194 may also utilize object and gesture recognition engine 190 while performing gesture recognition. In one example, object and gesture recognition engine 190 may include a collection of gesture filters, each comprising information concerning a gesture that may be performed. The object and gesture recognition engine 190 may compare the data captured by capture device 20 to the gesture filters in a gesture library to identify when a user has performed one or more gestures. In one example, image and audio processing engine 194 may use the object and gesture recognition engine 190 to detect the performance of a particular gesture performed by an end user of the computing system 10. In one embodiment, the object and gesture recognition engine 190 may utilize machine learning classification techniques.

Figure 4A:
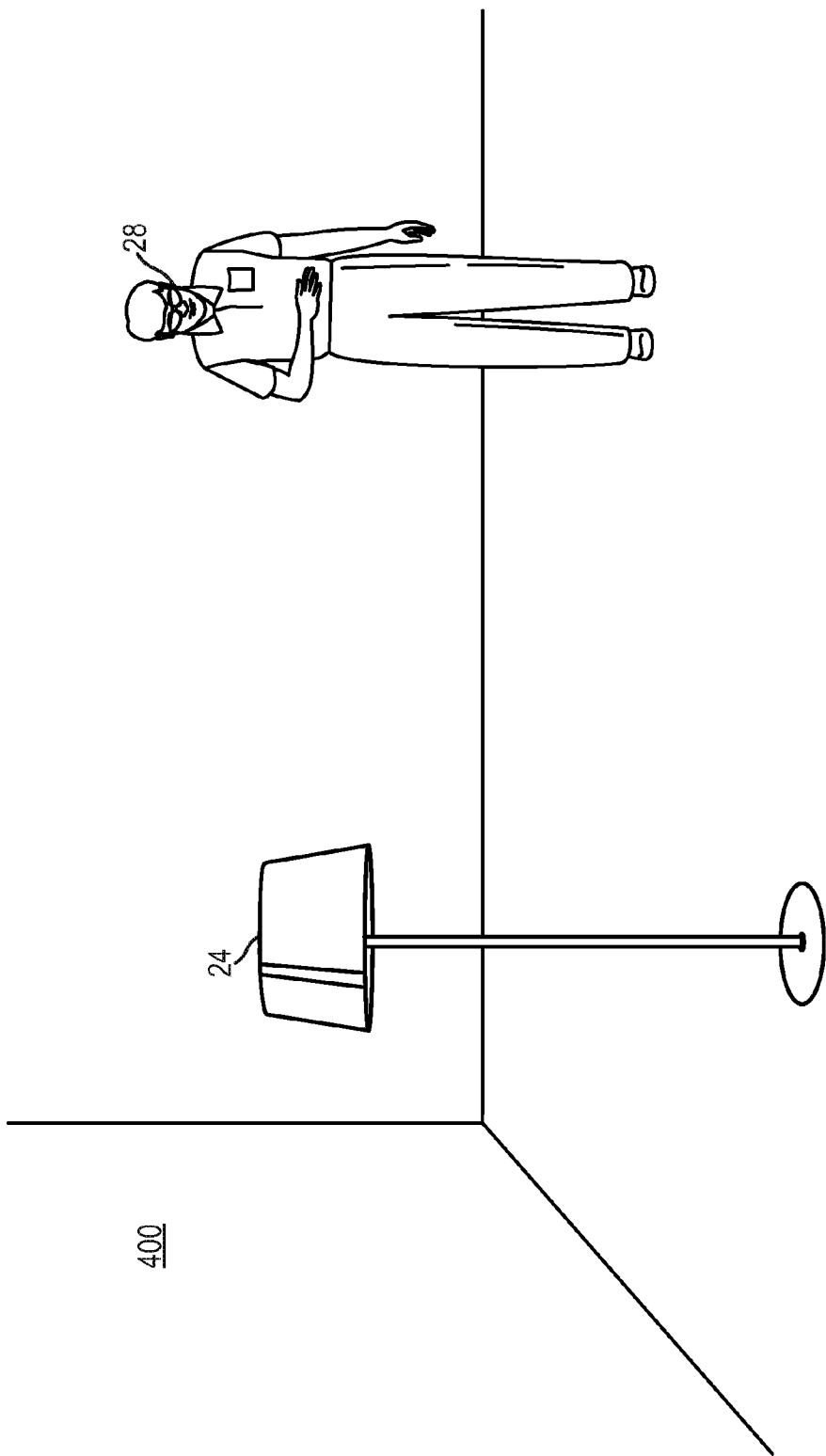
FIG. 4A depicts one embodiment of an environment in which an end user wearing an HMD performs a hand and/or finger gesture in order to control an application running on the HMD.

FIG. 4A depicts one embodiment of an environment 400 in which an end user wearing an HMD 28 performs a hand and/or finger gesture in order to control an application running on the HMD 28. As depicted, the environment 400 includes a lamp 24, which may comprise an artificial source of IR light. In some cases, sunlight (e.g., through an open window) may comprise another source of non-HMD generated IR light within the environment 400.

Figure 4B:
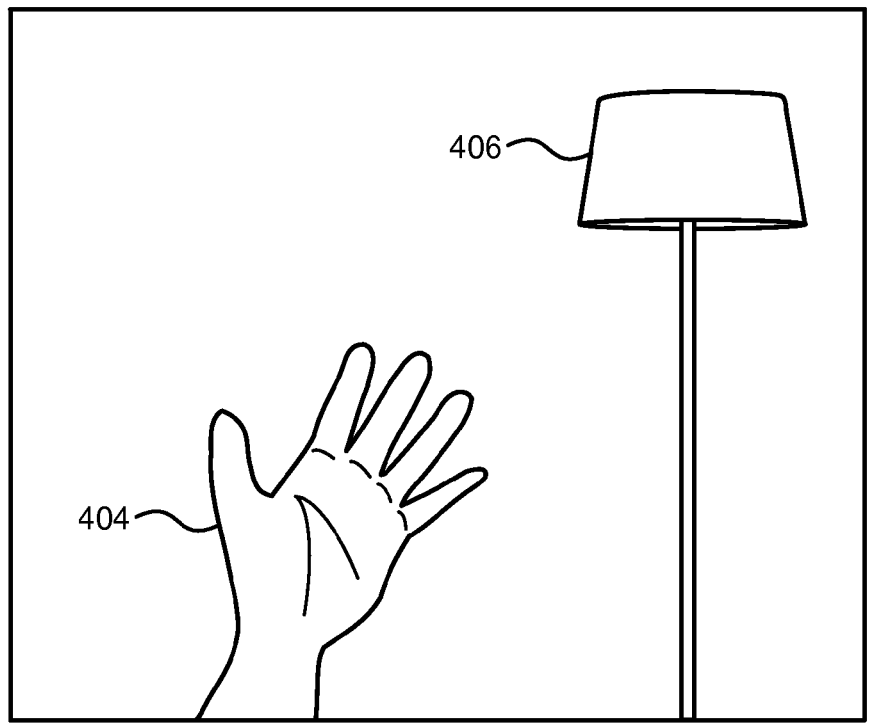
FIG. 4B depicts one embodiment of a first image captured by the HMD depicted in FIG. 4A.

FIG. 4B depicts one embodiment of a first image captured by the HMD 28 of FIG. 4A. The first image may be captured using an IR image sensor or an integrated color and IR image sensor, such as the integrated RGB and IR sensor depicted in FIG. 2C. The first image may be captured while the HMD 28 emits IR light into the environment 400. As depicted, the first image includes both a hand 404 of the end user and portions of a lamp 406 from which IR light has been captured. The HMD 28 may emit IR light into the environment 400 using an IR light source such that a first range is illuminated (e.g., objects within one meter of HMD 28 may be illuminated). The first range may be set to a distance in which an end user of the HMD may perform hand and/or finger gestures.

Due to the exponential decay of light intensity over distance from a light source, the first range may be adequately illuminated for purposes of detecting reflections of the projected IR light. As such, the first image may not capture IR light reflected from objects within the environment 400 beyond the first range. In some cases, the first range may be adjusted by modulating the initial light intensity of the IR light projected from the light source and/or the exposure time of the capturing image sensor. The light source may include a laser, a laser diode, and/or an LED.

Figure 4C:
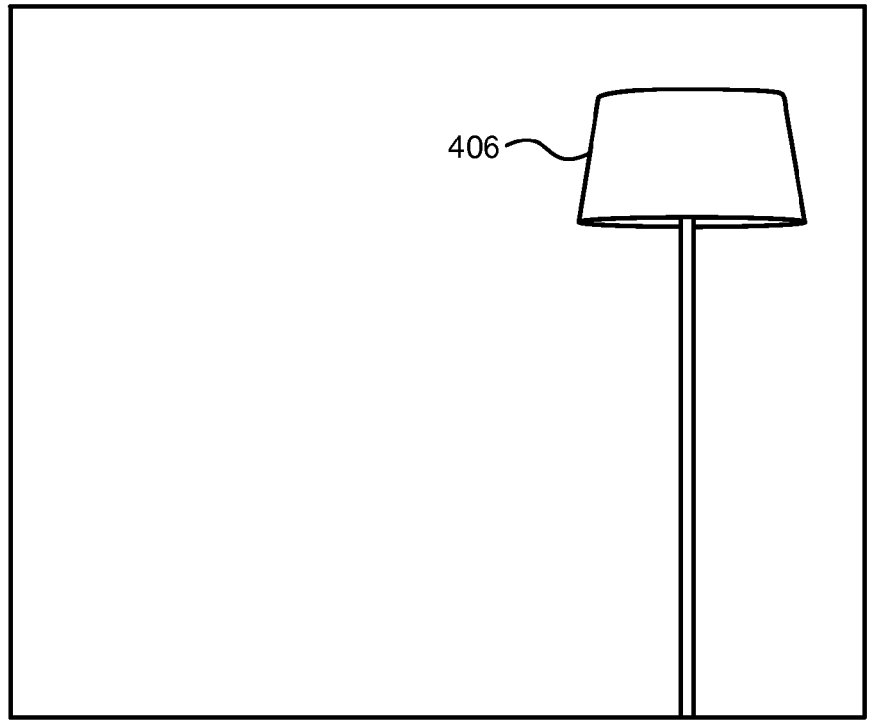
FIG. 4C depicts one embodiment of a second image captured by the HMD depicted in FIG. 4A.

FIG. 4C depicts one embodiment of a second image captured by the HMD 28 of FIG. 4A. The second image may be captured using an IR image sensor or an integrated color and IR image sensor. The second image may be captured while the HMD 28 does not emit IR light into the environment 400. As depicted, the second image includes portions of a lamp 406 from which IR light has been captured. IR light reflected from the hand 404 of the end user is not captured as the HMD 28 is not emitting IR light into the environment 400.

Figure 4D:
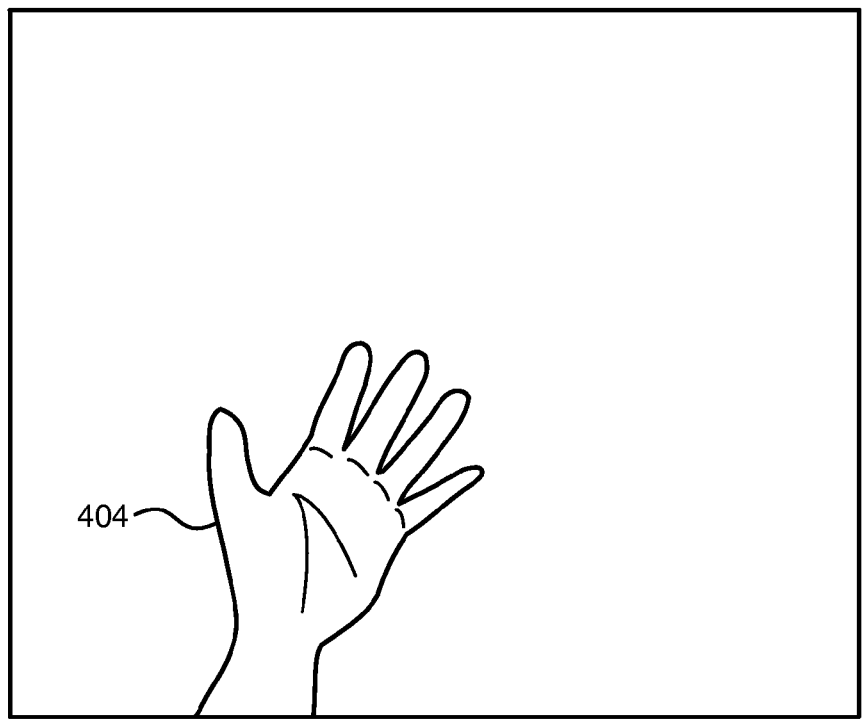
FIG. 4D depicts one embodiment of a difference image based on the first image of FIG. 4B and the second image of FIG. 4C in order to eliminate background noise due to non-HMD sources of IR light within an environment.

FIG. 4D depicts one embodiment of a difference image based on the first image of FIG. 4B and the second image of FIG. 4C in order to eliminate background noise due to non-HMD sources of IR light within the environment (e.g., due to sunlight or artificial light sources). As depicted, the difference image includes a hand 404 of the end user, but not portions of a lamp 406 (or other objects from which non-HMD sources of IR light are reflected within the environment 400).

Figure 4E:
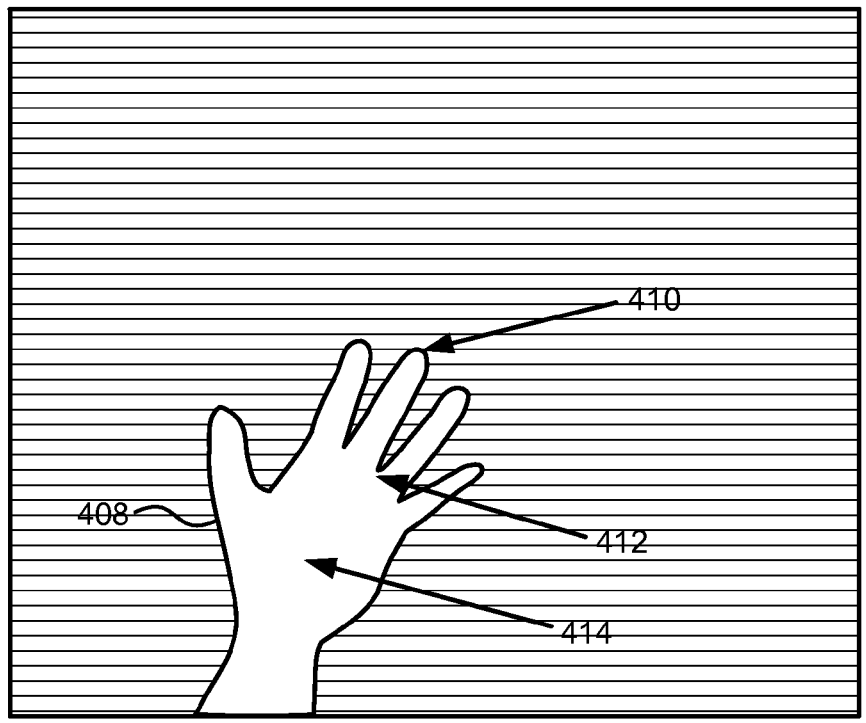
FIG. 4E depicts one embodiment of a segmented image including a hand region associated with an end user of an HMD.

FIG. 4E depicts one embodiment of a segmented image including a hand region 408 associated with the end user of the HMD 28 of FIG. 4A. The hand region 408 may include hand features, such as fingertips 410, finger valleys 412, and a hand center 414 (or palm center). The hand center 414 may be associated with a centroid of the hand region 408. In some embodiments, the difference image of FIG. 4D may be thresholded and then the hand center 414 may be determined by calculating an average X location and an average Y location for the hand region 408. The hand center 414 may comprise the center of mass (e.g., a mean X, mean Y coordinate) for the hand region 408 excluding the fingers of the hand region 408. The hand region 408 may correspond with the largest connected component within the segmented image. In one example, the largest connected component may correspond with the largest set of white pixels associated with a thresholded image.

Figure 5:
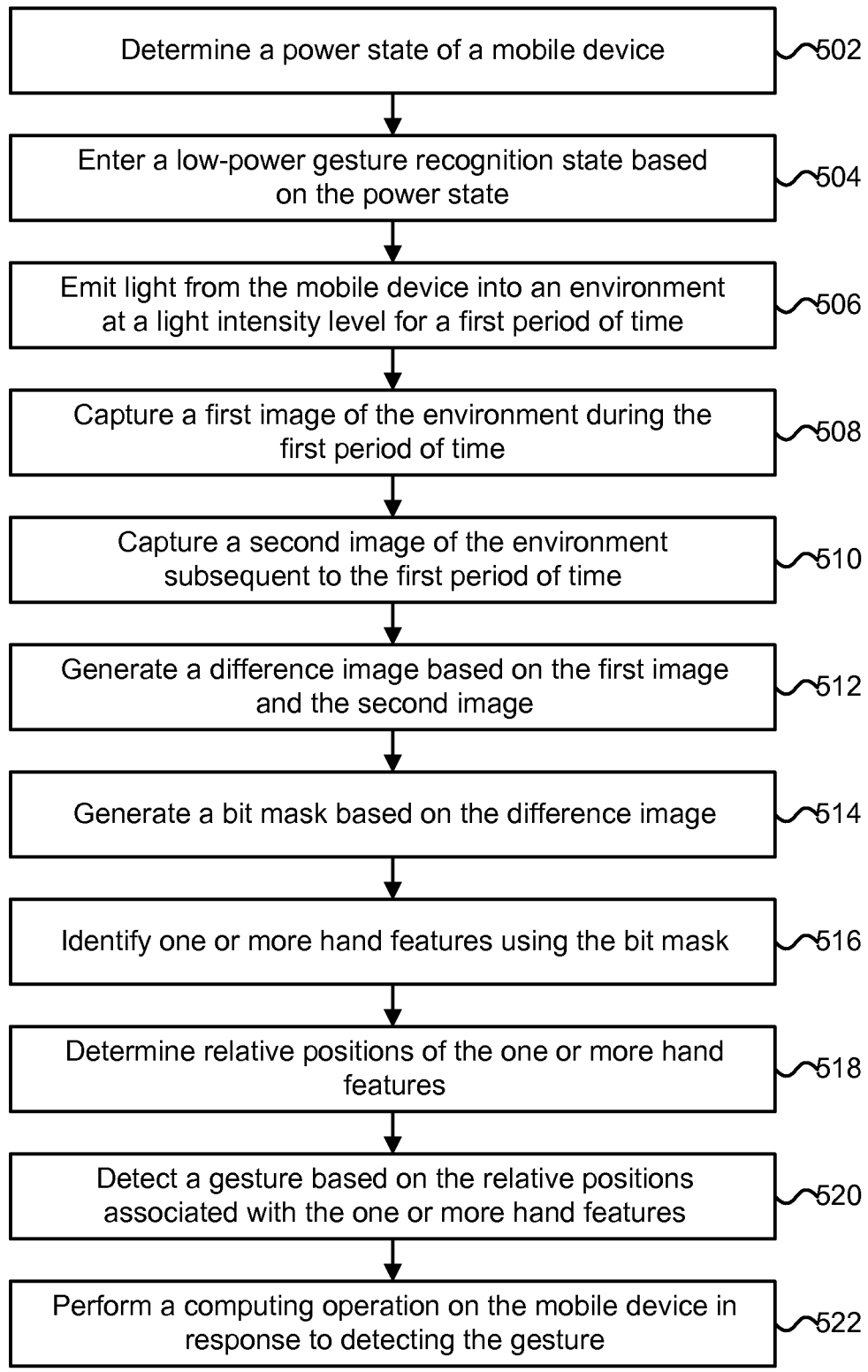
FIG. 5 is a flowchart describing one embodiment of a method for recognizing gestures within a near-field environment.

FIG. 5 is a flowchart describing one embodiment of a method for recognizing gestures within a near-field environment. In one embodiment, the process of FIG. 5 may be performed by a mobile device, such as mobile device 19 in FIG. 1.

In step 502, a power state of a mobile device is determined. The power state of the mobile device may be associated with whether the mobile device is operating in a low-power state or a high-power state. The mobile device may operate in a low-power state if an energy level for a battery (or other source of energy) is below a particular threshold or if the mobile device is not connected to another source of energy (e.g., via a secondary mobile device such as mobile device 5 in FIG. 2A). The mobile device may also enter a low power state if the ambient IR light within an environment is below a particular threshold.

In step 504, a low-power gesture recognition state is entered based on the power state. In some embodiments, the mobile device may operate in the low-power gesture recognition state by default unless overridden by a computing application running on the mobile device.

In step 506, light from the mobile device is emitted into an environment at a light intensity level for a first period of time. The light may comprise IR light emitted using a laser, a laser diode, and/or an LED. The light intensity level may be set such that the exponential decay of light intensity over distance from the mobile device adequately illuminated objects within a first range (or distance) from the mobile device for purposes of detecting reflections of the projected IR light. In one embodiment, the first range may comprise one meter from the mobile device (i.e., within a region in which an end user of the mobile device may perform hand and/or finger gestures). The first period of time may be set such that one or more images of the environment may be captured while the light is emitted into the environment. The first period of time may correspond with a camera or image sensor exposure time necessary to detect objects within the first range. In one example, the first period of time may comprise 100 ns. In some cases, the light may be emitted into the environment at periodic intervals, such as every 20 ms, and corresponding images may be captured in order to track hand and finger movements over time.

In step 508, a first image of the environment is captured during the first period of time. The first image may be captured using an IR image sensor or an integrated color and IR image sensor, such as the integrated RGB and IR sensor depicted in FIG. 2C. In step 510, a second image of the environment is captured subsequent to (or before) the first period of time when the environment is not illuminated with IR light emitted from the mobile device. In step 512, a difference image is generated based on the first image and the second image. The difference image may be generated by subtracting the second image from the first image.

In step 514, a bit mask is generated based on the difference image. In one embodiment, the bit mask may be generated by thresholding the difference image. In one example, the bit mask may comprise a binary image (e.g., an image consisting of black and white pixel values). In step 516, one or more hand features are identified using the bit mask. In one embodiment, the one or more hand features may include fingertips, finger valleys, and hand centers. In some cases, fingertips and finger valleys may be detected by applying a second-order derivative filter to the difference image or a corresponding thresholded image. A hand center may be associated with a centroid of a hand region within the bit mask. In one embodiment, the hand center may comprise the center of mass (e.g., a mean X, mean Y coordinate) for the largest connected component within the bit mask. In one example, the largest connected component may correspond with the largest set of white pixels associated with a thresholded image.

In step 518, relative positions of the one or more hand features are determined. The relative positions of the one or more hand features may correspond with a particular gesture performed by an end user of the mobile device.

In step 520, a gesture is detected based on the relative positions associated with the one or more hand features. In one embodiment, a gesture may comprise a motion or pose performed by an end user of the mobile device. The gesture may comprise a dynamic and/or static gesture. A dynamic gesture is one comprising a motion, such as the end user of the mobile device rotating their hand in a swirling motion or folding their hands open and closed similar to the opening and closing of a book. Dynamic finger gestures may also be detected, such as the pinching of a thumb and index finger. A static gesture may include a static pose, such as the end user pointing their index and middle fingers while the other fingers are pointed towards a hand center.

In some embodiments, a gesture (e.g., a static gesture or a dynamic gesture) may be detected based on one or more feature descriptors associated with one or more hand features identified through classification (e.g., via machine learning classification techniques) without computing the absolute or relative positions of the one or more hand features. In one example, region statistics (e.g., the size of a group of connected pixels or a degree of contour curvature) may be used to identify a segmented blob associated with a hand that is in a particular hand state (e.g., that the hand is open or closed).

In step 522, a computing operation on the mobile device is performed in response to detecting the gesture. In one embodiment, the computing operation may comprise the initiation of an electronic communication (e.g., a text message or instant message) or the retrieval of information based on the selection of a real or virtual object within a field of view of the mobile device.

Figure 6:
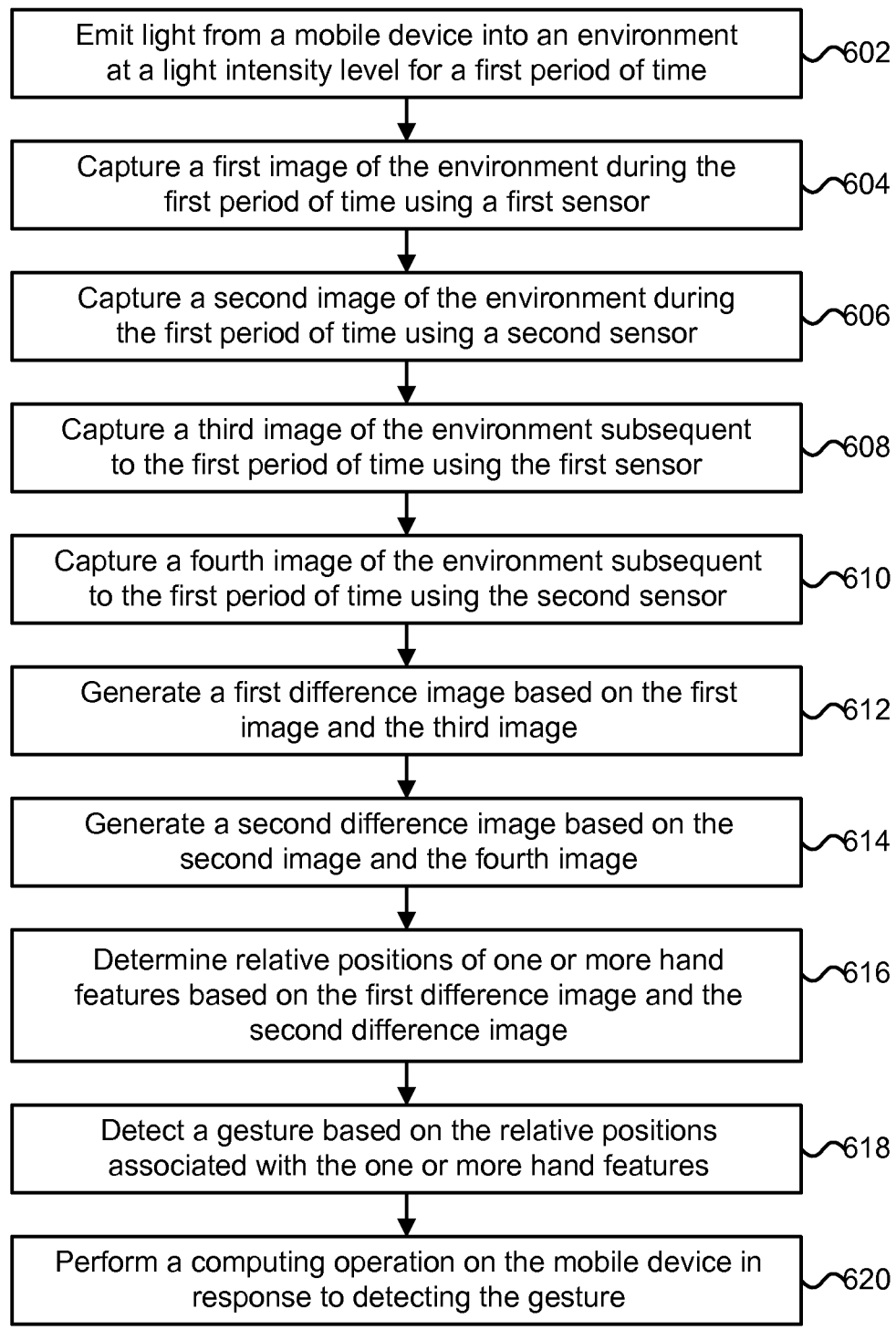
FIG. 6 is a flowchart describing an alternative embodiment of a method for recognizing gestures within a near-field environment.

FIG. 6 is a flowchart describing an alternative embodiment of a method for recognizing gestures within a near-field environment. In one embodiment, the process of FIG. 6 may be performed by a mobile device, such as mobile device 19 in FIG. 1.

In step 602, light from the mobile device is emitted into an environment at a light intensity level for a first period of time. The light may comprise IR light emitted using a laser, a laser diode, and/or an LED. The light intensity level may be set such that the exponential decay of light intensity over distance from the mobile device adequately illuminated objects within a first range (or distance) from the mobile device for purposes of detecting reflections of the projected IR light. In one embodiment, the first range may comprise one meter from the mobile device (i.e., within a region in which an end user of the mobile device may perform hand and/or finger gestures). The first period of time may be set such that one or more images of the environment may be captured while the light is emitted into the environment. The first period of time may correspond with a camera or image sensor exposure time necessary to detect objects within the first range. In one example, the first period of time may comprise 20 ns. In some cases the light may be emitted into the environment at periodic intervals, such as every 2 ms, and corresponding images may be captured in order to track hand and finger movements over time.

In step 604, a first image of the environment is captured during the first period of time using a first sensor. In step 606, a second image of the environment is captured during the first period of time using a second sensor. The first sensor and the second sensor may comprise IR image sensors. The first sensor and the second sensor may be attached to or integrated with the mobile device. The distance between the first sensor and the second sensor may be fixed relative to the mobile device.

As the first image and the second image are captured at different points of view, parallax calculations may be performed given position information regarding the two different points in space associated with the first sensor and the second sensor in order to generate depth information. Although depth information may be determined using two image sensors and one light source associated with the mobile device, it may also be determined using one image sensor and two different light sources. In one embodiment, a first image may be captured using an image sensor while a first light source of two different light sources is used to illuminate an environment during a first point in time and a second image may be captured using the image sensor while a second light source of the two different light sources is used to illuminate the environment at a second point in time subsequent to the first point in time.

In step 608, a third image of the environment is captured subsequent to the first period of time using the first sensor. In step 610, a fourth image of the environment is captured subsequent to the first period of time using the second sensor. The third image and the fourth image may be captured subsequent to the first period of time when the environment is not illuminated with IR light emitted from the mobile device.

In step 612, a first difference image is generated based on the first image and the third image. The first difference image may be generated by subtracting the third image from the first image. In step 614, a second difference image is generated based on the second image and the fourth image. The second difference image may be generated by subtracting the fourth image from the second image.

As the first difference image and the second difference image are captured at different angles or using different points of view, the difference in pixel locations associated with hand features or edges within the two images may be used to determine relative depth information. In one embodiment, a relative depth value may be generated for each boundary of a near-field object, such as a hand or finger. For example, it may be determined that a thumb is closer to the mobile device than a pinky finger or other parts of a hand (e.g., pixels associated with a thumb boundary may move more than pixels associated with a pinky boundary when comparing the first difference image and the second difference image). In one embodiment, depth information associated with a particular hand feature may be determined based on the change in one or more pixel locations associated with the particular hand feature between the first difference image and the second difference image.

In some cases, depth information may be determined for each scan line (or row of pixels) whenever an object boundary is identified (e.g., whenever a boundary between a near-field object and the background is detected). In this case, depth information may be determined for hand features including fingertips and finger valleys, as well as the thumb-side boundary of a hand (e.g., the boundary near the median nerve) and the pinky-side boundary of a hand (e.g., the boundary near the ulnar nerve or hypothenar eminence). Thus, relative depth information at boundary points of hands and fingers may be extracted from the first difference image and the second difference image and used to infer a spatial orientation of the hands and fingers within a first range of the mobile device.

In step 616, relative positions of one or more hand features are determined based on the first difference image and the second difference image. The one or more hand features may include fingertips, finger valleys, and hand centers. The relative positions of the one or more hand features may correspond with a particular gesture performed by an end user of the mobile device. In step 618, a gesture is detected based on the relative positions associated with the one or more hand features. In one embodiment, a gesture may comprise a motion or pose performed by an end user of the mobile device. The gesture may comprise a dynamic and/or static gesture. A dynamic gesture is one comprising a motion, such as the end user of the mobile device rotating their hand in a swirling motion or folding their hands open and closed similar to the opening and closing of a book. Dynamic finger gestures may also be detected, such as the pinching of a thumb and index finger. A static gesture may include a static pose, such as the end user pointing their index and middle fingers while the other three fingers are pointed towards a hand center. In step 620, a computing operation on the mobile device is performed in response to detecting the gesture. In one embodiment, the computing operation may comprise the initiation of an electronic communication (e.g., a text message or instant message) or the retrieval of information based on the selection of a real or virtual object within a field of view of the mobile device.

One embodiment of the disclosed technology includes a light source, a first sensor, and one or more processors in communication with the light source and the first sensor. The one or more processors cause the light source to emit IR light into an environment at a light intensity level during a first period of time. The one or more processors cause the first sensor to capture a first image of the environment during the first period of time and to capture a third image of the environment during a second period of time subsequent to the first period of time. The light source does not emit the IR light into the environment during the second period of time. The one or more processors generate a first difference image based on the first image and the third image, determine one or more relative positions of one or more hand features based on the first difference image, detect a gesture based on the one or more relative positions of the one or more hand features, and perform a computing operation in response to detecting the gesture.

One embodiment of the disclosed technology includes emitting IR light from a mobile device into an environment at a light intensity level during a first period of time, capturing a first image of the environment during the first period of time using a first sensor, and capturing a third image of the environment during a second period of time subsequent to the first period of time using the first sensor. The IR light is not emitted from the mobile device during the second period of time. The method further comprises generating a first difference image based on the first image and the third image, determining one or more relative positions associated with one or more hand features based on the first difference image, detecting a gesture based on the one or more relative positions, and performing a computing operation on the mobile device in response to detecting the gesture.

One embodiment of the disclosed technology includes projecting IR light from the mobile device into an environment during a first period of time, capturing a first image of the environment during the first period of time using a first sensor, capturing a second image of the environment during the first period of time using a second sensor, and capturing a third image of the environment during a second period of time subsequent to the first period of time using the first sensor. the IR light is not projected from the mobile device during the second period of time. The method further comprises capturing a fourth image of the environment during the second period of time using the second sensor, generating a first difference image based on the first image and the third image, generating a second difference image based on the second image and the fourth image, determining one or more relative positions of one or more hand features based on the first difference image and the second difference image, detecting a gesture based on the one or more relative positions of the one or more hand features, and performing a computing operation on the mobile device in response to detecting the gesture.

Figure 7:
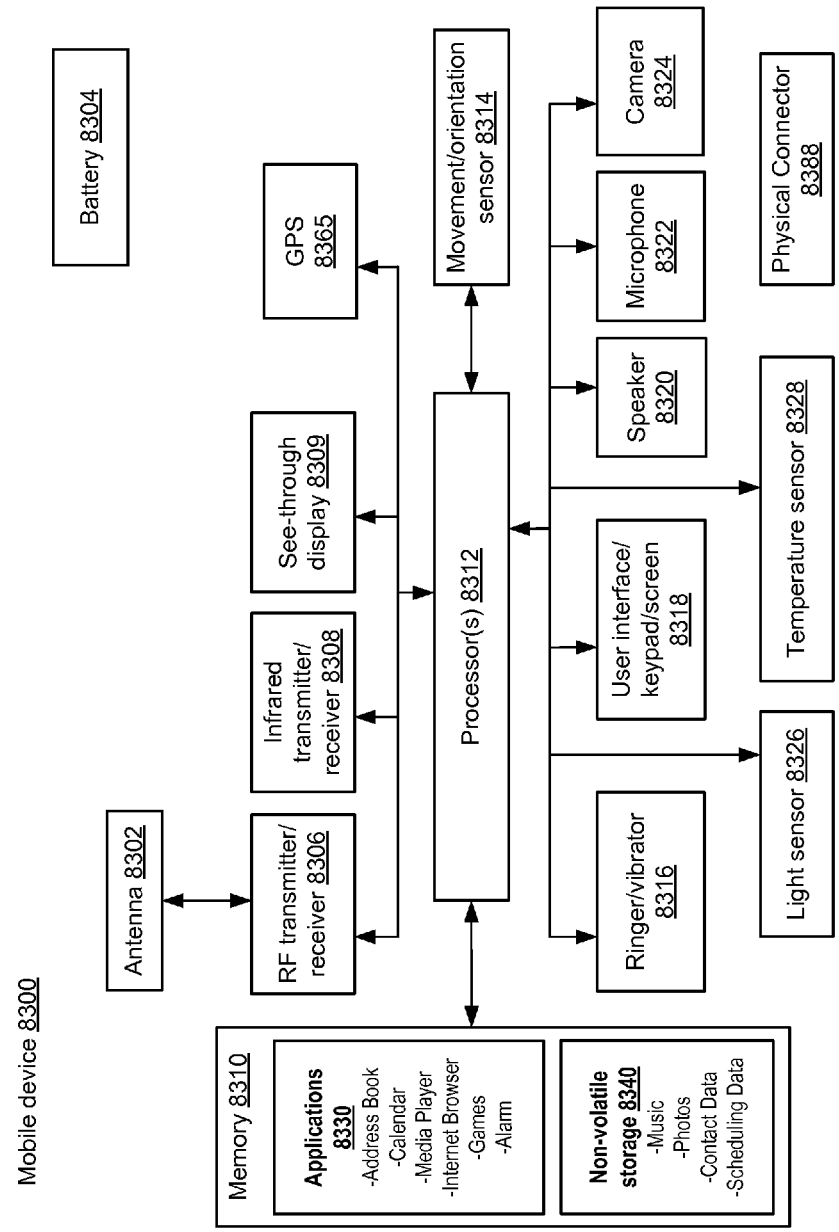
FIG. 7 is a block diagram of one embodiment of a mobile device.

FIG. 7 is a block diagram of one embodiment of a mobile device 8300, such as mobile device 19 in FIG. 1. Mobile devices may include laptop computers, pocket computers, mobile phones, HMDs, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 are in communication with a see-through display 8309. The see-through display 8309 may display one or more virtual objects associated with a real-world environment. The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electronic device for recognizing gestures, comprising:
   a light source;
   a first sensor; and
   one or more processors in communication with the light source and the first sensor, the one or more processors cause the light source to emit IR light into an environment at a first light intensity level during a first period of time, the one or more processors detect that an amount of ambient IR light within the environment is greater than a particular threshold, the one or more processors cause the light source to emit the IR light into the environment at a second light intensity level different from the first light intensity level during a second period of time in response to detecting that the amount of ambient IR light within the environment is greater than the particular threshold, the one or more processors cause the first sensor to capture a first image of the environment during the second period of time and to capture a third image of the environment during a third period of time different from the second period of time, the light source does not emit the IR light into the environment during the third period of time, the one or more processors generate a first difference image based on the first image and the third image, the one or more processors identify one or more hand features based on the first difference image, the one or more processors detect a gesture based on the one or more hand features, the one or more processors perform a computing operation in response to detecting the gesture.

2. The electronic device of claim 1, further comprising:
   a second sensor, the one or more processors cause the second sensor to capture a second image of the environment during the second period of time and to capture a fourth image of the environment during the third period of time, the one or more processors generate a second difference image based on the second image and the fourth image, the one or more processors identify the one or more hand features using the first difference image and the second difference image.

3. The electronic device of claim 2, wherein:
   the one or more processors determine depth information associated with a first hand feature of the one or more hand features based on a change in one or more pixel locations associated with the first hand feature between the first difference image and the second difference image.

4. The electronic device of claim 3, wherein:
   the first hand feature comprises a finger peak.

5. The electronic device of claim 1, wherein:
   the first sensor comprises a color filter and an IR filter.

6. The electronic device of claim 1, wherein:
   the second light intensity level is set such that backscattering of the emitted IR light due to objects within a first range of the mobile device may be detected by the first sensor.

7. The electronic device of claim 6, wherein:
   the first range comprises one meter.

8. The electronic device of claim 1, wherein:
   the electronic device comprises an HMD;
   the second light intensity level is less than the first light intensity level;
   the third period of time is subsequent to the second period of time; and
   the second period of time is subsequent to the first period of time.

9. A method for recognizing gestures, comprising:
   emitting IR light from a mobile device into an environment at a first light intensity level during a first period of time;
   detecting that an amount of ambient IR light within the environment is greater than a particular threshold;
   emitting the IR light from the mobile device into the environment at a second light intensity level different from the first light intensity level during a second period of time, the emitting the IR light from the mobile device into the environment at the second light intensity level is performed in response to detecting that the amount of ambient IR light within the environment is greater than the particular threshold;
   capturing a first image of the environment during the second period of time using a first sensor;
   capturing a third image of the environment during a third period of time different from the second period of time using the first sensor, the IR light is not emitted from the mobile device during the third period of time;
   generating a first difference image based on the first image and the third image;
   identifying one or more hand features based on the first difference image;
   detecting a gesture based on the one or more hand features; and
   performing a computing operation on the mobile device in response to detecting the gesture.

10. The method of claim 9, further comprising:
    capturing a second image of the environment during the second period of time using a second sensor;
    capturing a fourth image of the environment during the third period of time using the second sensor; and
    generating a second difference image based on the second image and the fourth image, the identifying one or more hand features includes identifying the one or more hand features using the first difference image and the second difference image.

11. The method of claim 9, wherein:
    the identifying one or more hand features includes determining depth information associated with the one or more hand features.

12. The method of claim 9, wherein:
    the first sensor comprises a monochrome filter and an IR filter.

13. The method of claim 9, wherein:
    the second light intensity level is set such that backscattering of the emitted IR light due to objects within a first range of the mobile device may be detected by the first sensor.

14. The method of claim 13, wherein:
    the first range comprises one meter.

15. The method of claim 9, wherein:
the one or more hand features include one or more finger valleys.

16. The method of claim 9, wherein:
the mobile device comprises an HMD;
the second light intensity level is less than the first light intensity level;
the third period of time is subsequent to the second period of time; and
the second period of time is subsequent to the first period of time.

17. One or more hardware storage devices containing processor readable code for programming one or more processors to perform a method for recognizing gestures using a mobile device comprising the steps of:
projecting IR light from the mobile device into an environment at a first light intensity level during a first period of time;
detecting that an amount of ambient IR light within the environment is greater than a particular threshold;
determining a second light intensity level less than the first light intensity level in response to detecting that the amount of ambient IR light within the environment is greater than the particular threshold;
projecting the IR light from the mobile device into the environment at the second light intensity level during a second period of time;
capturing a first set of images of the environment during the second period of time using a first sensor;
capturing a second set of images of the environment during the second period of time using a second sensor;
capturing a third set of images of the environment during a third period of time different from the second period of time using the first sensor, the IR light is not projected from the mobile device during the third period of time;
capturing a fourth set of images of the environment during the third period of time using the second sensor;
generating a first set of difference images based on the first set of images and the third set of images;
generating a second set of difference images based on the second set of images and the fourth set of images;
determining one or more relative positions of one or more hand features based on the first set of difference images and the second set of difference images;
detecting a gesture based on the one or more relative positions of the one or more hand features; and
performing a computing operation on the mobile device in response to detecting the gesture.

18. The one or more hardware storage devices of claim 17, wherein:
the determining one or more relative positions includes determining depth information associated with the one or more hand features, the detecting a gesture includes detecting the gesture based on the depth information associated with the one or more hand features.

19. The one or more hardware storage devices of claim 17, wherein:
the first sensor comprises an integrated color and IR image sensor.

20. The one or more hardware storage devices of claim 17, wherein:
the one or more hand features include one or more finger valleys;
the gesture comprises a dynamic gesture;
the mobile device comprises an HMD;
the IR light emitted from the mobile device is emitted using an IR LED;
the third period of time is subsequent to the second period of time; and
the second period of time is subsequent to the first period of time.

* * * * *